Figure 1:
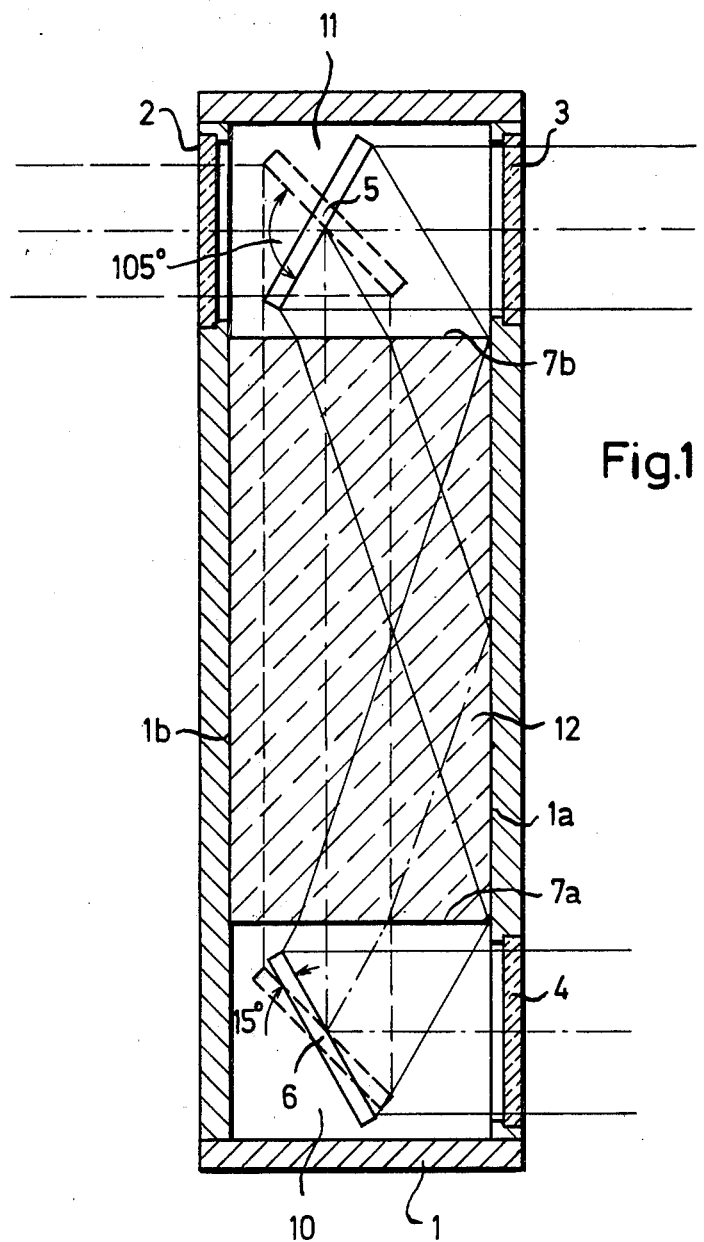

United States Patent [19]

Aurin

[11] 4,123,151
[45] Oct. 31, 1978

[54] PERISCOPIC MIRROR SYSTEM WITH SELECTABLY CHANGEABLE DIRECTION OF VIEWING

[75] Inventor: Friedrich Aurin, Heidenheim, Germany

[73] Assignee: Carl Zeiss, Oberkochen, Germany

[21] Appl. No.: 792,680

[22] Filed: May 2, 1977

[30] Foreign Application Priority Data

May 28, 1976 [DE] Fed. Rep. of Germany ....... 2623955

[51] Int. Cl.² .......................... G02B 5/08; G02B 7/24
[52] U.S. Cl. .................................................. 350/301
[58] Field of Search .................... 350/301, 52, 23, 302, 350/307

[56] References Cited

U.S. PATENT DOCUMENTS

| 2,130,006 | 9/1938 | Gundlach | 350/302 |
| 2,167,657 | 8/1939 | Karnes | 350/301 |

FOREIGN PATENT DOCUMENTS

| 348,816 | 3/1936 | Italy | 350/52 |
| 544,217 | 4/1942 | United Kingdom | 350/301 |

*Primary Examiner*—Jon W. Henry
*Attorney, Agent, or Firm*—Hopgood, Calimafde, Kalil, Blaustein & Lieberman

[57] ABSTRACT

The invention contemplates a periscope mirror system wherein viewing on a selected one of two 180°-opposed viewing axes is provided to a single exit-mirror for directing exit light in the same direction regardless of the selected viewing axis. The entrance mirror and the exit mirror are angularly positionable on parallel pivot axes which for a first direction of viewing involve direct reflection from the entrance mirror to the exit mirror, and which for the opposite direction of viewing involve indirect reflection from the entrance mirror to the exit mirror via an intermediate image-erecting third mirror.

10 Claims, 2 Drawing Figures

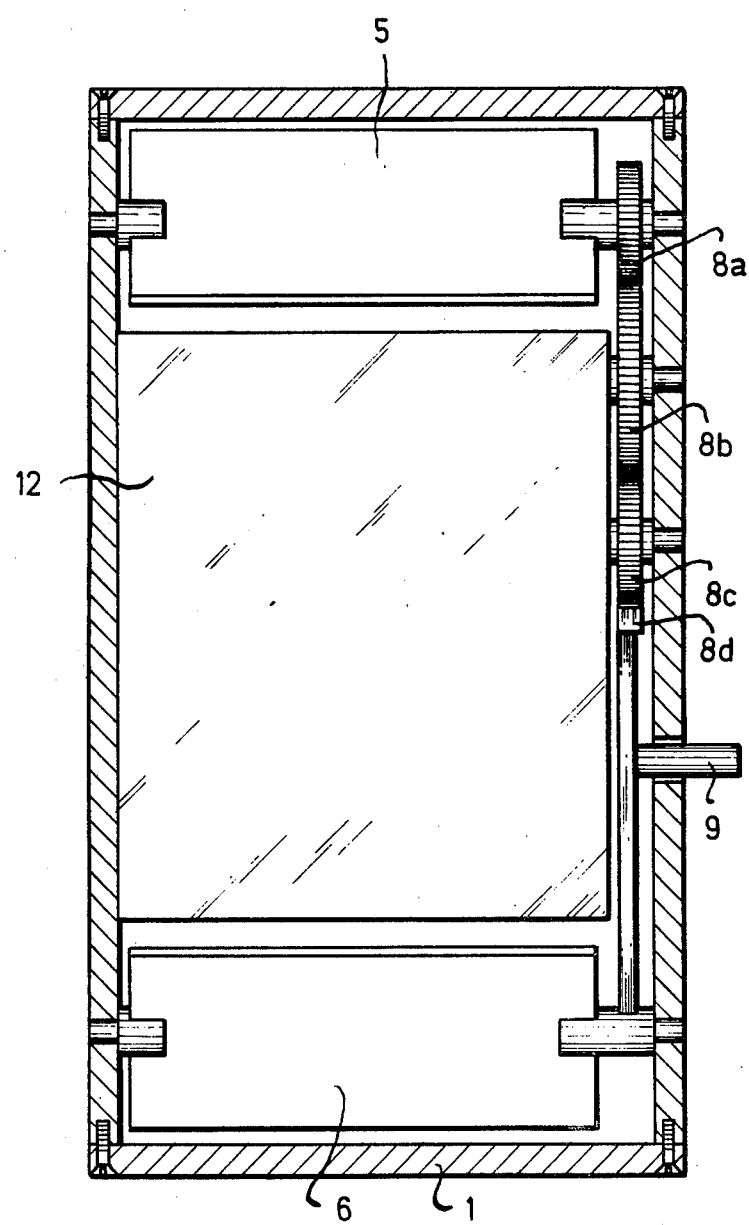

PERISCOPIC MIRROR SYSTEM WITH SELECTABLY CHANGEABLE DIRECTION OF VIEWING

The present invention relates to a periscope having two positions of the viewing axis which form with each other a 180° angle in the horizontal plane.

Periscopes are intended to permit viewing despite obstacles to vision. The simplest periscope consists of two plane mirrors, the upper or entrance mirror deflecting the optical axis perpendicularly downward from the horizontal direction of observation, and the lower or exit mirror deflecting the vertically extending optical axis horizontally into the direction of viewing. Entrance and exit are thus in spaced parallel relation, dependent upon the length of the periscope. With a constant geometrical length of the optical axis, the length reduced to air can be shortened if, instead of the angular mirror, an angular prism of a optically denser material than air is used.

The known periscopes permit observation around an obstacle only in one direction, preferably in the forward direction. Panoramic periscopes are also known, which permit observation of the entire horizon. They have the disadvantage that the observer must either leave his position if he wants to direct the periscope to a target which lies to the side of him or behind him, or that a complicated, and accordingly expensive, optical and mechanical system is required for rotation and image erection. There are also known double-view optical sights which permit two positions of the entrance axis which form an angle of 180° with each other in the horizontal plane. In this type of double-view sight, two telescopes are combined into a single apparatus so that the optical expense is also great in this case.

The object of the present invention is to provide an angular reflection system for periscopes which make it possible, with the use of simple means, to shift from observation with direction of view forward to observation with direction of view rearward, without the observer having to change his location.

It is a further object to provide such a periscope in which the height of the periscope reduced to air is less than its periscopic height.

These objects are achieved in accordance with the invention by providing selective availability of two directional orientations of the viewing axis, using an entrance mirror which is rotatable around a horizontal axis and an exit mirror which is rotatable around an axis parallel to the first axis, such that rays for a first directional orientation of the viewing axis are deflected directly from the entrance mirror to the exit mirror (these mirrors being arranged parallel to each other), while for the other directional orientation of the viewing axis the entrance mirror can be displaced 105° (about its rotation axis) while the exit mirror is displaced 15° in the opposite direction about its rotation axis, the rays being then deflected via at least one reflective surface on the inner wall of the periscope shaft.

The position of the mirrors and the deflection of the rays result from the requirement that the horizon is to appear erect in both directions of view. In order to satisfy this requirement there are required, in the forward direction of view, an even number of reflections and, in the rearward direction of view, an odd number of reflections. The position of the two mirrors for the forward direction of view is therefore so selected that the upper mirror deflects the light entering from in front by 90° onto the lower mirror, and the latter deflects the light incident on it again by 90° to the exit window in the direction towards the observer. For the rearward direction of view, the upper mirror is turned to such an extent that it reflects the bundle of light incident upon it through the rear entrance window towards the rear mirrored wall of the shaft. From the wall of the shaft, the light is projected to the lower, which is turned slightly in the opposite direction, and is then reflected from the latter to the exit window in the direction toward the observer.

The periscope shaft preferably has the shape of a right parallelopiped, the rear wall of the shaft located on the side of the exit window being mirrored. If the rotation of the two mirrors is independent of each other, then upward or downward elevational extent of the visual range can be extended by slight angular amounts (for the instance ± 10°), by individual adjustment of the elevation of the entrance or exit direction, thus causing change in the entrance or exit direction, by twice the angle of rotation of the mirror.

For rapid shifting of the direction of viewing from forward to backward there are provided, in one advantageous embodiment of the invention, mechanical means which effect a coupling of the rotary movements of the entrance mirror and the exit mirror.

If, in addition to the rear wall of the shaft the front wall of the shaft is also mirrored, a larger periscopic height can be covered by multiple reflections also in the rearward direction of view.

A reduction in the optical path from the exit to the entrance, referred to the periscopic height from the entrance axis to the exit axis, is achieved in the manner that the entrance mirror and the exit mirror are arranged in air-filled chambers and the periscopic shaft present between the chambers consists of an optically denser medium.

The advantages obtained with the invention reside, in particular, in the fact that a technically simple device is provided for a periscope, which makes it possible for the observer to aim the periscope at targets which lie either behind or in front of his position, without his having to leave his place or change the position of his head or of his body.

An illustrative embodiment of the invention is shown in the drawings and will be described in further detail below. In said drawings:

FIG. 1 is a vertical sectional view of a periscope having the angle-mirror system of the invention; the section being taken parallel to a side elevation of the periscope; and FIG. 2 is a vertical sectional view through the periscope of FIG. 1, the section being taken parallel to a front elevation of the periscope.

In the drawings, 1 denotes the periscope housing, and 1a and 1b are the rear and front inner walls of the periscope shaft; both of which inner walls may be reflective. The front entrance window of the periscope is designated 2, the rear entrance window is designated 3, and the exit window is designated 4. The entrance mirror 5 of the periscope is so turned in the solid-line showing of FIG. 1 that it deflects light coming through the rear entrance window 3 onto the mirrored inner wall 1a of the shaft. The exit mirror 6 (solid-line position) deflects the rays of the light impinging upon it towards the exit window 4. For the forward direction of view, the entrance mirror 5 is turned by 105° (about its horizontal axis of rotation) and the exit mirror 6 by 15° in the opposite direction (about its horizontal axis of rotation), thus achieving 90° reflections at both mirrors 5–6, with viewing via the front entrance window 2. Such rotation of the mirrors can be effected individually or together by means of a mechanical coupling, for instance a gear coupling 8a–8d, 8d being a gear segment carried by and therefore rotatable about the horizontal pivot for the exit mirror 6. By actuating the lever 9 which is connected with the segment 1d, the gearing is placed in operation.

The mirrors 5 and 6 are arranged in air-filled chambers adjoining which, between interface or boundary lines 7a and 7b, is a shaft part 12 which consists of optically denser material; such as a prism. Upon the shifting of the direction of view from rearward to forward, the mirrors 5–6 are swung into the position shown in dashed outlines.

What is claimed is:

1. Periscope structure having the capability of providing a selected one of two 180° opposed generally horizontal viewing axes, said structure comprising an entrance mirror and an exit mirror, a hollow shaft supporting both said mirrors in spaced relation and for rotation about parallel pivot axes, said mirrors being positionable in a first position relationship to reflect light at substantially right angles in the manner of a periscope wherein said entrance mirror reflects entering light directly to said exit mirror along a vertical axis defined by and between said mirrors, said light entering on a first of said viewing axes from one side of said shaft, and wherein said exit mirror reflects such entrance-mirror reflected light on an exit axis extending from the other side of said shaft, an intermediate mirror within said shaft between said entrance and exit mirrors and facing but offset in substantial parallelism to said vertical axis, said offset being in the direction of said other side of said shaft, said entrance and exit mirrors being also positionable in a second position relationship wherein said entrance mirror reflects to said exit mirror via said intermediate mirror light entering on the second of said viewing axes and from said other side of said shaft and wherein said exit mirror reflects such intermediate-mirror reflected light on said exit axis, and means for moving said entrance and exit mirrors from one to the other of said first and second position relationships.

2. Periscope structure according to claim 1, in which said shaft is of the shape of a right parallelopiped.

3. Periscope structure according to claim 1, wherein said last-defined means includes mechanical means coupling said entrance and exit mirrors for coordinated pivotal movement to assure said first position relationship for one selected viewing direction and to assure said second position relationship for the other selected viewing direction.

4. Periscope structure according to claim 1, in which a second intermediate mirror is positioned in said shaft between said entrance and exit mirrors and in substantially parallel facing relation to said first-defined intermediate mirror, and in which said second intermediate mirror is offset from said generally vertical axis in the direction opposite to that of said first-mentioned offset.

5. Periscope structure according to claim 1, in which said entrance and exit mirrors are in separate gas-filled regions of said shaft, and in which an optically more dense intermediate region separates said gas-filled regions.

6. Periscope structure according to claim 5, in which said intermediate region has a flat surface immediately adjacent to and at least coextensive with said intermediate mirror, whereby all intermediate-mirror reflection is accommodated by said intermediate region.

7. Periscope structure according to claim 1, in which said shaft has separate windows on opposite sides of said shaft at the respective entrance-light aspects for said entrance mirror.

8. Periscope structure according to claim 7, in which said shaft has but a single window on said other side and at the exit-light aspect of said exit mirror.

9. Periscope structure according to claim 3, in which the coupling ratio provided by said mechanical means is substantially 7:1 for entrance-mirror angular displacement in a given direction in relation to exit-mirror angular displacement in the direction opposite to said given direction.

10. Periscope structure according to claim 5, in which the interfaces of said gas-filled regions with said optically more dense region are in parallel planes.

* * * * *